J. H. HUSSEY.

Shoes.

No. 6,438. Reissued May 18, 1875.

WITNESSES:

P. C. Dieterich

W. C. McArthur

INVENTOR:

John H. Hussey per C. H. Watson & Co

ATTORNEYS.

THE GRAPHIC CO. PHOTO-LITH. 39 & 41 PARK PLACE, N.Y.

UNITED STATES PATENT OFFICE.

JOHN H. HUSSEY, OF BALTIMORE, MD., ASSIGNOR, BY MESNE ASSIGNMENTS, TO ADLER, CLEMENT & WIEL, AND ELBRIDGE W. BUBIER.

IMPROVEMENT IN SHOES.

Specification forming part of Letters Patent No. 153,829, dated August 4, 1874; reissue No. 6,438, dated May 18, 1875; application filed April 24, 1875.

*To all whom it may concern:*

Be it known that I, JOHN H. HUSSEY, of Baltimore, in the county of Baltimore and State of Maryland, have invented certain new and useful Improvements in Shoes; and I do hereby declare that the following is a full, clear, and exact description thereof that will enable others skilled in the art to which it appertains to make and use the same, reference being had to the accompanying drawings, and to the letters of reference marked thereon, which form a part of this specification.

My invention relates more particularly to children's shoes, but is equally applicable to boots and shoes of any size, and has for its object to improve the construction of those boots and shoes intended to prevent wearing out at the toes, by providing a complete protector for the upper at the toe, extending above the tap; and it consists in cutting from the sole, next to the insole, a strip cut from the inside toward the outer edge around the toe, and turned up to form a flange, extending above the sole from which it is cut; and also in the combination of parts as hereinafter more fully described.

Figure 1:
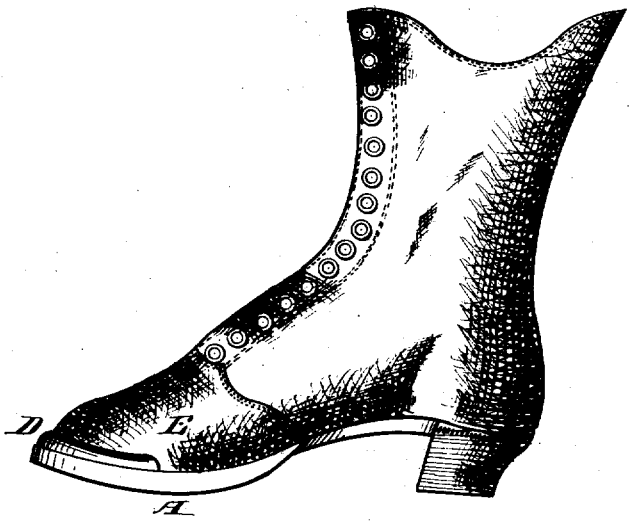
Figure 2:
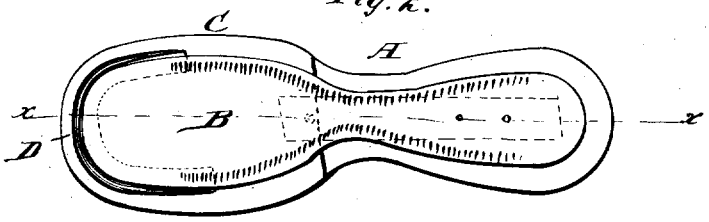
Figure 3:
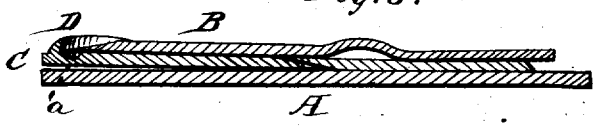
Figure 4:
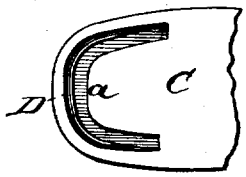

In the accompanying drawing, Figure 1 is a side view of a shoe embodying my invention. Fig. 2 is a view of the entire sole of the shoe. Fig. 3 is a longitudinal section of the same taken on the line *x x* of Fig. 2, and Fig. 4 is a plan view of the toe of the sole from which the flange is cut.

A represents the outer sole, and B the insole of a shoe, between which is a tap or middle sole, C, and E represents the upper. In the upper part of the sole C a part of the leather is cut or slit from the inside toward the outside near the edge of the sole. This part, so cut or slit, is bent or pressed upward, so as to form a flange, D, which extends above the upper surface of the sole C, thus forming a perfect protection for the toe of the upper E, extending above the upper surface of the sole C, and this flange being cut from the inside of the sole, no material is wasted, and being a part of the middle or tap sole to keep the shoe, between the upper and sole, from dampness, which is not the case where separate pieces are cut and set in for tips. *a* is the channel in the sole C, formed by cutting the flange D.

Having thus fully described my invention, what I claim, and desire to secure by Letters Patent, is—

1. The flange D, formed from the middle-sole, and making a part of the same, said flange being cut from the inside toward the edge of the sole around the toe, and projecting above the upper surface of the sole from which it is cut, substantially as and for the purpose specified.

2. The flange D, formed from the sole C, and making a part of the same, said flange being cut from the inside toward the edge of the sole, and projecting above the upper surface of the sole, in combination with the insole B and the upper E, substantially as and for the purpose set forth.

In testimony that I claim the foregoing I have hereunto set my hand this 23d day of April, 1875.

JOHN H. HUSSEY.

Witnesses:
P. M. BENNER,
L. D. MILLER.